May 13, 1930.   O. W. DUNHAM   1,758,357
BEARING AND SHAFT ASSEMBLY
Filed March 29, 1928   2 Sheets-Sheet 1
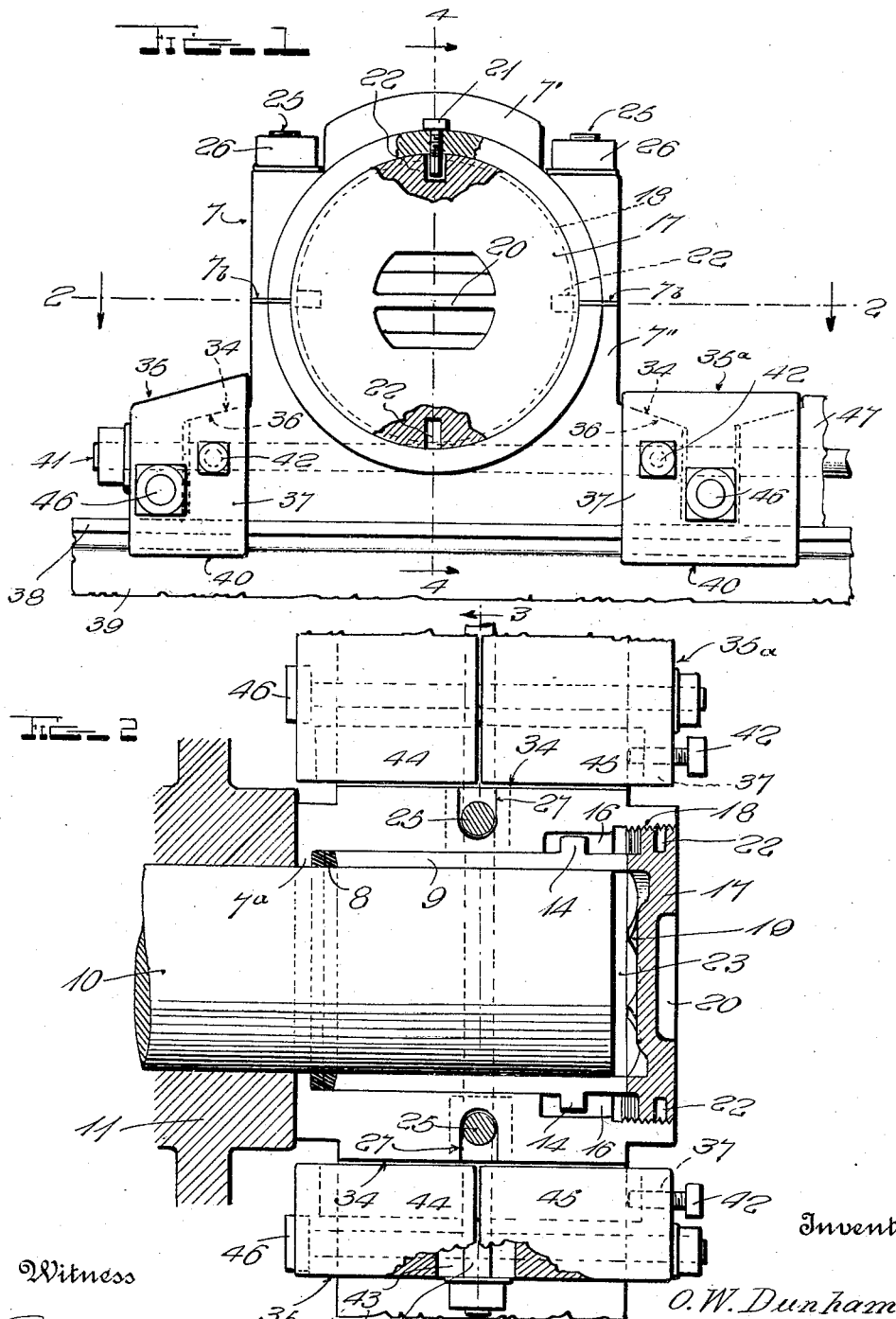
Inventor
O. W. Dunham,
By H. R. Willson & Co
Attorneys
Witness

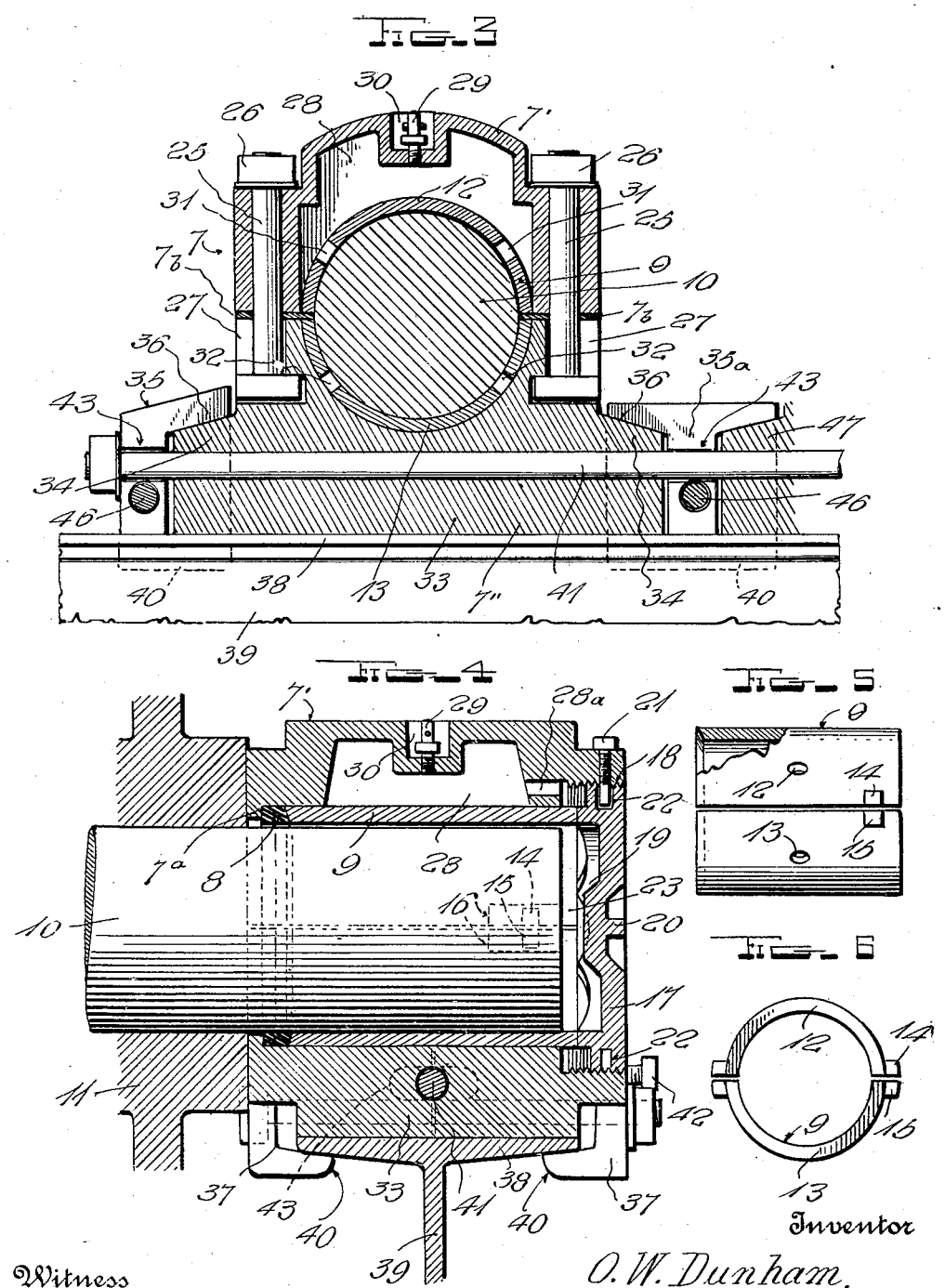

Patented May 13, 1930

1,758,357

UNITED STATES PATENT OFFICE

ORSON W. DUNHAM, OF WEBB CITY, MISSOURI, ASSIGNOR TO WERTZBERGER DERRICK COMPANY

BEARING AND SHAFT ASSEMBLY

Application filed March 29, 1928. Serial No. 265,636.

The invention relates to bearings for the crown blocks used on the tops of oil well derricks. The crown blocks are constructed principally of twelve-inch I-beams bracketed together side by side but spaced apart sufficiently to receive the sheaves, a short shaft passes through each sheave and projects about five inches at each side thereof, and bearings are provided for the ends of these shafts. As the sheave hubs are in abutting relation with the inner ends of the bearings, this does not permit any packing seat which opens at the inner end of either bearing and consequently the oil from said bearing easily runs out on the sheave end thereof, and the crown block is so inaccessible that the bearings are neglected as to lubrication and are therefore short-lived. It is the principal object of my invention therefore to provide a practical means for packing the inner end of a crown block or analogous bearing around the shaft and providing a suitable chamber or chambers for grease which will supply the bearing for two or three months.

A further object of the invention is to provide a bearing having a single internal sleeve which acts not only as a packing compressor, but as a shaft-engaging bushing.

With the foregoing in view, the invention resides in the novel subject matter hereinafter described and claimed, description being accomplished by reference to the accompanying drawings.

Fig. 1 is an elevation partly broken away and in section, illustrating the improved crown block bearing and the I-beam by which it is supported.

Fig. 2 is a horizontal sectional view on line 2—2 of Fig. 1.

Fig. 3 is a vertical sectional view on line 3—3 of Fig. 2.

Fig. 4 is a vertical sectional view on line 4—4 of Fig. 1.

Fig. 5 is a side elevation, partly in section, of the combined bushing and packing compressor.

Fig. 6 is an end elevation of said bushing and packing compressor.

The preferred form of construction here in illustrated, will be specifically described, with the understanding that within the scope of the invention as claimed, variations may be made.

The numeral 7 on the drawing denotes a bearing body open at both ends, provided at its inner end with an inwardly projecting continuous shoulder 7ª. Appropriate compressible packing 8 is disposed against the shoulder 7ª, and a soft metal bushing or sleeve 9, extending substantially from end to end of the bearing body 7, has its inner end disposed against said packing. This sleeve 9 and the packing 8, snugly surround the shaft 10 of the sheave 11 and said sleeve constitutes a bushing for said shaft, as well as serving to compress the packing 8 when slid inwardly, thus holding said packing in tight contact with said shaft.

Sleeve 9 is divided into upper and lower sections 12—13 which are interchangeable when the lower section has become badly worn. These sections are formed with lateral lugs 14—15 received in grooves 16 in the body 7 to hold the sleeve 9 against rotation.

A cap 17 is provided to close the outer end of the bearing body 7, said cap being threaded into said body as shown at 18 and having spaced inwardly projecting lugs 19 abutting the outer end of sleeve 9. This cap is provided with wrench-engaging means 20 for tightening it to inwardly force the sleeve 9 and tighten the packing 8. Suitable means, such as a screw 21 receivable in recesses 22, is provided to lock the cap 17 after adjustment.

The interior of the cap 17 forms an effective chamber 23 for lubricating grease. Due to the prevalence of such grease and the tight packing, preventing loss thereof, wear upon the sleeve 10 will be slight, but whenever such wear has become appreciable, the cap 17 may be removed, the sleeve 9 totally or partially removed and inverted, and the parts then again secured in assembled relation. Inverting of the sleeve presents the previously unworn upper section 12 thereof so that it will receive the wear at the lower side of the shaft. Preferably, whenever the sleeve is inverted, the packing 8 is renewed, thus taking advantage of the disassembly of parts to accomplish this end.

To facilitate assembly and disassembly of parts, the body 7 is preferably divided in a central horizontal plane, into upper and lower halves 7'—7", said halves being tightly secured together by bolts 25 and nuts 26, the bolts being removably held in grooves 27 in the lower half 7" of the body 7. A gasket 7ᵇ is interposed betwen the halves 7'—7" and extends also between the sleeve halves 12—13, so spacing these halves 12—13 as to cause the lower half to take all wear. The inner side of the upper bearing 7' is recessed as at 28 to receive grease, the recess 28 being provided with a grease inlet nipple or the like 29 set in a recess 30 to prevent injury when hoisting the bearing to the top of the derrick frame. Sleeve 9 is formed with openings 31 communicating with the recess 28, and in its opposite side portion, said sleeve is provided with similar openings 32 to communicate with said recess when the sleeve is inverted. Grease may be injected into the recess 28 through the nipple 29 and this grease flows through the openings 31 or 32 as the case may be, lubricating the parts 9—10. Chamber 23 communicates with recess 28 through a port 28ᵃ in the body section 7', to receive grease therefrom.

In the preferred construction, the lower half 7' of the body 7 is provided with an elongated base 33 whose ends project laterally from said body and are provided with outwardly declined upper sides 34. Two socket members 35—35ᵃ slidably receive these base ends and are provided with cam portions 36 at their upper portions contacting with said declined sides 34 of the base ends. These socket members 35—35ᵃ embody end walls 37 to straddle the upper portion 38 of an I-beam 39 upon which the base 33 rests, said walls 37 having lugs 40 to underlie said beam portion 38. A bolt 41 passes longitudinally through the base 33 and through the socket members 35—35ᵃ and upon tightening of this bolt, said socket members slide up the base sides 34 causing tight contact of the lugs 40 and the base 33 with the beam portion 38, thereby tightly clamping the bearing to the beam.

The socket members 35—35ᵃ are of greater internal width than the ends of the base 33 received therein, and set screws 42 are threaded through the outermost of the walls 37 into contact with said base, permitting adjustment of the bearing transversely of the beam 39, the members 35—35ᵃ being formed with slots 43 receiving said bolt.

Preferably, each member 35—35ᵃ is vertically divided into end sections 44—45, connected by a bolt 46. This construction permits application of the members 35—35ᵃ to the beam 19 without the necessity of sliding them onto the ends of said beam. Member 35ᵃ is shown of dual form to anchor one end of another closely positioned bearing body 47, and the bolt 41 may pass through both bodies 7—47 and in fact through any number of such bodies disposed in close relation.

On account of existing advantages for the details of construction herein disclosed, such details are preferably employed. However, within the scope of the invention as claimed, variations may be made as above stated.

I claim:—

1. In a bearing and shaft assembly in which the shaft enters the bearing at one end only, the other end being entirely closed; a bearing body having an inwardly projecting shoulder at its shaft-receiving end, said body being provided with a grease chamber, a sleeve contacting slidably with the inner side of said bearing body and having one end spaced from said shoulder, annular packing means between said sleeve and shoulder, a shaft extending into said sleeve through the packing-engaging end thereof, said shaft terminating within the opposite end of the bearing body, and sleeve-sliding means outwardly spaced from the extremity of said shaft in a direction extending longitudinally of the latter for sliding said sleeve to compress said packing means around the shaft, the space between said shaft extremity and said sleeve-sliding means being in communication with said grease chamber to receive grease therefrom.

2. In a bearing and shaft assembly in which the shaft enters the bearing at one end only, the other end being entirely closed; an internally cylindrical bearing body internally recessed to provide a grease chamber, the shaft-receiving end of said body having an internal shoulder, an annular packing engaging said shoulder, a sleeve slidable in said body and at its inner end abutting said packing, said sleeve having a port communicating with said recess, a shaft extending into said sleeve through its packing-engaging end and terminating within the other end of said bearing body, and a cap adjustably mounted in said other end of said body, said cap having a body portion spaced outwardly from the extremity of said shaft in a direction extending longitudinally of the latter, said cap being provided with a flange portion abutting the end of said sleeve remote from said packing for inwardly forcing said sleeve to compress said packing, said grease chamber being in communication with the space between the cap body and said terminal of the shaft to supply grease thereto.

3. In a bearing and shaft assembly in which the shaft enters the bearing at one end only, the other end being entirely closed; a bearing body having an inwardly projecting shoulder at its shaft-receiving end, said body being provided with a grease chamber, an annular packing abutting said shoulder, a sleeve within said bearing body having one end in contact with said packing, a shaft extending into said sleeve through the packing-engaging end thereof, said shaft terminating within the opposite end of the bearing body, and a cap having a threaded engagement with and alone completely closing the outer end of said body, said cap having a body portion spaced outwardly from the extremity of said shaft in a direction extending longitudinally of the latter, said cap being provided with a flange portion abutting the end of said sleeve remote from said packing for sliding said sleeve to compress the packing around the shaft, the space between said body portion of said cap and said shaft extremity being in communication with said grease chamber to receive grease therefrom.

In testimony whereof I have hereunto affixed my signature.

ORSON W. DUNHAM.